United States Patent
Kisin et al.

(10) Patent No.: US 9,146,982 B2
(45) Date of Patent: *Sep. 29, 2015

(54) AUTOMATED ELECTRONIC DISCOVERY COLLECTIONS AND PRESERVATIONS

(71) Applicant: International Business Machines Corporation, Armonk, NY (US)

(72) Inventors: Roman Kisin, San Jose, CA (US); Andrey Pogodin, Sunnyvale, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/025,239

(22) Filed: Sep. 12, 2013

(65) Prior Publication Data
US 2014/0012834 A1 Jan. 9, 2014

Related U.S. Application Data

(63) Continuation of application No. 13/543,333, filed on Jul. 6, 2012.

(51) Int. Cl.
*G06F 17/30* (2006.01)

(52) U.S. Cl.
CPC .... *G06F 17/30598* (2013.01); *G06F 17/30613* (2013.01); *G06F 17/3002* (2013.01); *G06F 17/30312* (2013.01); *G06F 17/30386* (2013.01)

(58) Field of Classification Search
USPC ........ 707/711, 736, 755, 708, 999.01, 999.03
See application file for complete search history.

(56) References Cited

U.S. PATENT DOCUMENTS

| 6,078,924 | A | 6/2000 | Ainsbury et al. | |
|---|---|---|---|---|
| 6,658,464 | B2 | 12/2003 | Reisman | |
| 7,734,637 | B2 | 6/2010 | Greifeneder et al. | |
| 7,822,707 | B1 * | 10/2010 | Yehuda et al. | 707/609 |
| 8,423,496 | B1 * | 4/2013 | Hauser | 706/47 |
| 8,458,465 | B1 * | 6/2013 | Stern et al. | 713/166 |
| 2002/0143929 | A1 * | 10/2002 | Maltz et al. | 709/224 |
| 2002/0198939 | A1 * | 12/2002 | Lee et al. | 709/203 |
| 2003/0177111 | A1 | 9/2003 | Egendorf et al. | |
| 2004/0111425 | A1 * | 6/2004 | Greifeneder et al. | 707/100 |
| 2007/0011267 | A1 * | 1/2007 | Overton et al. | 709/217 |
| 2007/0282992 | A1 * | 12/2007 | Liu | 709/223 |
| 2008/0288477 | A1 * | 11/2008 | Kim et al. | 707/4 |
| 2009/0024558 | A1 * | 1/2009 | Brethauer et al. | 707/1 |
| 2009/0063209 | A1 * | 3/2009 | Dubois et al. | 705/7 |
| 2009/0177679 | A1 * | 7/2009 | Boomer et al. | 707/102 |
| 2010/0057677 | A1 * | 3/2010 | Rapp et al. | 707/3 |
| 2011/0060749 | A1 * | 3/2011 | Petakov et al. | 707/755 |
| 2011/0191349 | A1 | 8/2011 | Ford et al. | |
| 2012/0284264 | A1 * | 11/2012 | Lankford et al. | 707/736 |
| 2013/0173539 | A1 * | 7/2013 | Gilder et al. | 707/622 |

* cited by examiner

*Primary Examiner* — Dung K Chau

(74) *Attorney, Agent, or Firm* — Joe Polimeni; Edell, Shapiro & Finnan, LLC

(57) ABSTRACT

A computer-implemented method, system and computer program product for collecting information from data sources by receiving a collection request at a collection tool to collect information, where the collection request includes data source information indicating a data source from which to retrieve the information. The data source information in the collection request is associated with one or more electronic data repositories in response to the data source indicated by the data source information being previously unidentified to the collection tool. The information is collected from the one or more associated electronic data repositories.

6 Claims, 4 Drawing Sheets

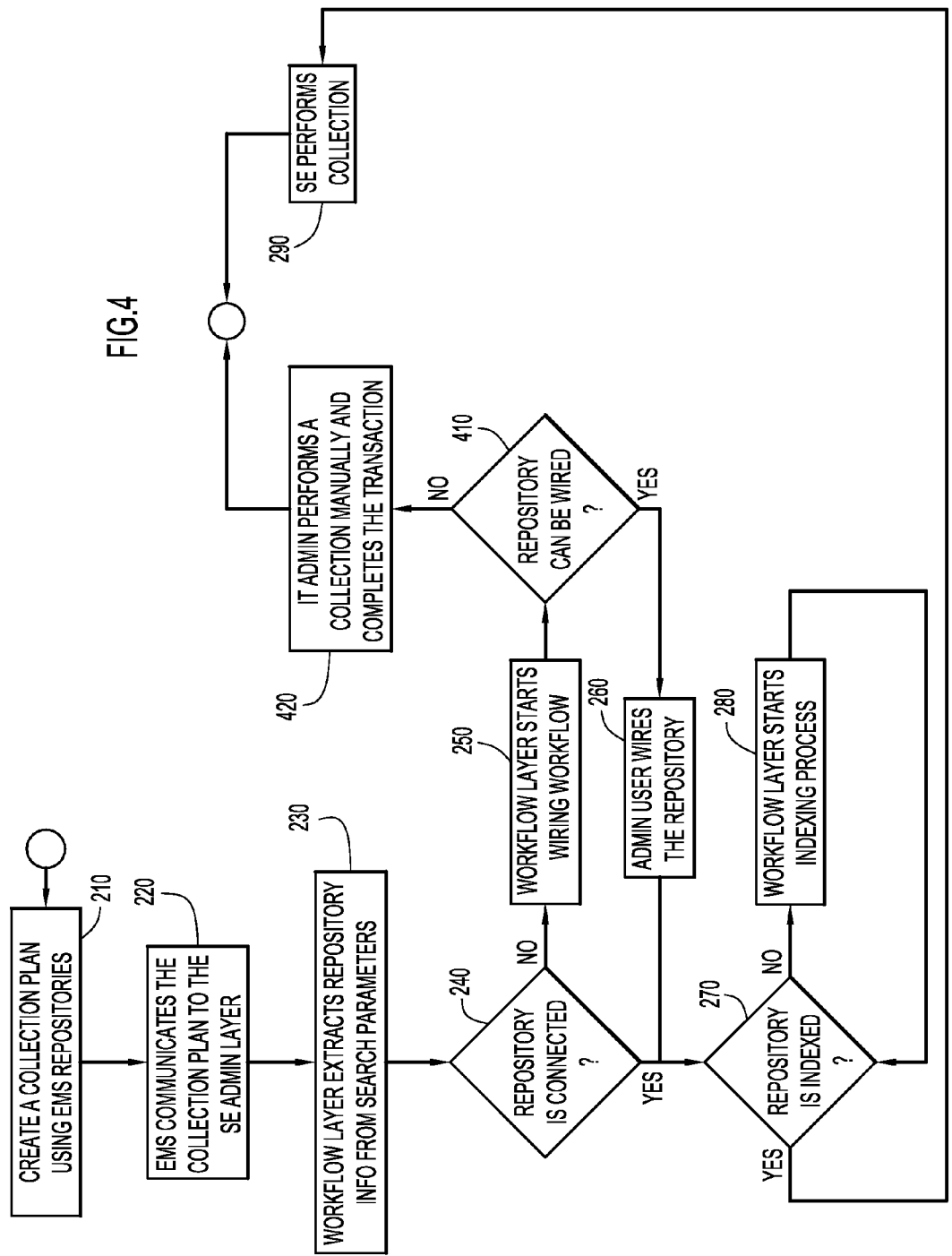

AUTOMATED ELECTRONIC DISCOVERY COLLECTIONS AND PRESERVATIONS

CROSS REFERENCE TO RELATED APPLICATIONS

The present application is a Continuation of U.S. Nonprovisional application Ser. No. 13/543,333, filed 6 Jul. 2012 and entitled "Automated Electronic Discovery Collections and Preservations," the disclosure of which is incorporated herein by reference in its entirety.

BACKGROUND

1. Technical Field

Present invention embodiments relate to electronic discovery, and more specifically, to the automated collection and preservation of information from electronic data repositories.

2. Discussion of the Related Art

Electronic discovery or eDiscovery refers to legal discovery for civil litigation for which the information to be "discovered" is in electronic form. Usually, the legal team will designate the relevant data (e.g., emails, instant messages, documents, etc.). Information Technology (IT) administrators will subsequently locate and connect any data repositories for which discovery is to be performed (e.g., by using digital forensics analysis, etc.).

Traditional techniques for eDiscovery use separate processes for eDiscovery Management Application (EMA) functions and certain search engine functions (e.g., database search engines that search electronically stored data). In order to begin the eDiscovery process, the legal team identifies the data repositories to be searched. The IT administrator subsequently connects the search engine to the data repositories and the data repositories are indexed by the search engine for use with the EMA as a separate administrative task. The indexing of the data repositories is meant to be performed well in advance of users doing any search tasks.

Typically, the IT administrator will direct or point the search engine to multiple data repositories, and the search engine performs a full indexing of the entire repository. Existing integrations between EMAs and search engines are implemented with this design in mind. In other words, the EMA only provides streamlined workflow if the search engines are already pre-connected to repositories and content of the repositories is already pre-indexed. If there is any deviation from this scenario, the legal team has to manage the connection process by requesting that the IT administrator locate a repository that was not available or indexed, connect the repository to the search engine, index the content, and perform any necessary steps to enable the EMA to perform automated collections from the newly added repository. The legal team then needs to check the completion status of the task. Once the newly added repository is indexed, the legal team can resume normal execution of a collection request. This process requires disparate teams to work together in a complicated workflow, which is troublesome for the legal team and prone to error. Further, this process results in large and out-of-date indexes, thereby increasing the cost of storage and adversely affect the quality of eDiscovery data. In addition, the EMAs use the notion of a logical data source while search engines require a computer addressable repository address and login credentials, further complicating the typical eDiscovery process.

BRIEF SUMMARY

According to embodiments of the present invention, a system, computer-implemented method, and computer program product are provided for collecting information from data sources by receiving a collection request at a collection tool to collect information, where the collection request includes data source information indicating a data source from which to retrieve the information. The data source information in the collection request is associated with one or more electronic data repositories in response to the data source indicated by the data source information being previously unidentified to the collection tool. The information is collected from the one or more associated electronic data repositories.

BRIEF DESCRIPTION OF THE SEVERAL VIEWS OF THE DRAWINGS

FIG. 4 is a procedural flow chart illustrating a manner in which an eDiscovery may be performed manually according to an embodiment of the present invention.

DETAILED DESCRIPTION

Figure 1:
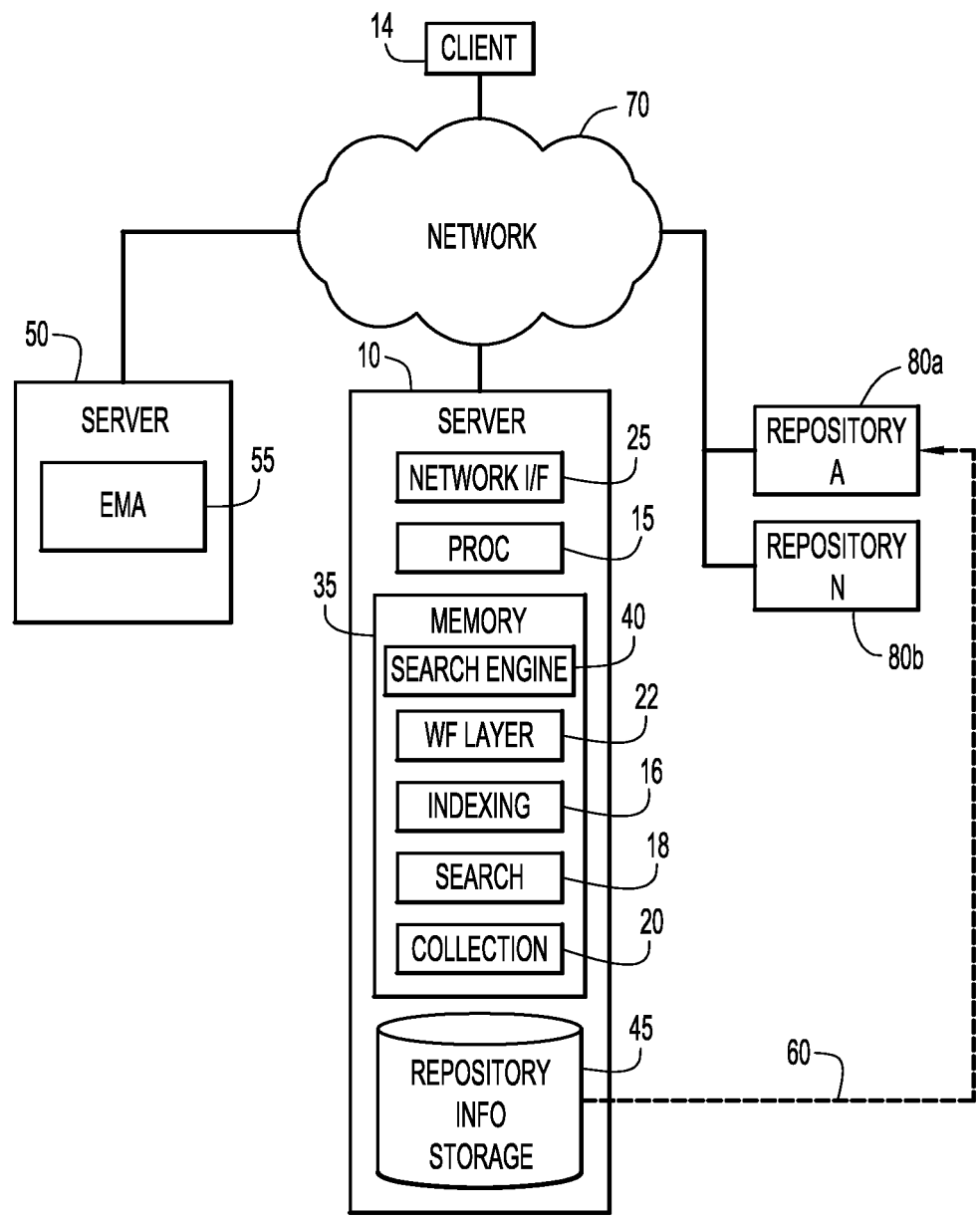
FIG. 1 is a diagrammatic illustration of an example computing environment for use with an embodiment of the present invention.

Present invention embodiments include EMA and search engine integration that is designed such that the search engine receives eDiscovery collection and preservation requests, together with data source information. Accordingly, the data source does not need to be predefined on the search engine side and the data does not need to be indexed in advance. When the data source is not completely identified in the requests or if the connection pathway is not accessible, a workflow request may be initiated to create a repository record in the search engine based in information coming from the EMA and to connect the search engine with the actual repository so that the search engine can perform indexing, search, and data collection functions. The data source information coming from EMA may be mapped in the search engine to multiple electronic repositories or a part of a repository. Further, if the repository is not yet indexed, indexing may be performed. If indexing requires human intervention, another workflow request may be initiated; otherwise, the request may initiate automated indexing. Once indexing is complete, collection and/or preservation can be completed based on information contained in the index. If the search engine fails to connect to the repository (e.g., incorrect connection information, authentication failure, the system is offline, etc.), another manual workflow may be initiated to fix the connection problem.

Present invention embodiments may employ a search engine that considers eDiscovery concepts such that the connection or setup of repositories via one or both of a physical connection or by way of computer addresses and permissions, and indexing of content becomes a part of a runtime operation, as opposed to a setup operation. Further, data source connection may be performed on demand. One of the search parameters passed to the search engine from the EMA (e.g., as part of an eDiscovery Management System (EMS)) contains the identifier of the data source and may contain other data source information (e.g., authentication information). If the data source is not connected or connected (computer accessible), a workflow layer of the search engine triggers a connection workflow. The workflow notifies a search engine operator and allows the search engine operator to setup, or to otherwise connect the data source, and indicate to the search engine that it can proceed with collection request.

In an eDiscovery environment, there is no need to maintain a frill index of all data sources that is traditionally performed in a typical eDiscovery prior to the search and collection process. Further, an automated eDiscovery collection request does not need to produce instant results to an end user. Accordingly, the search engine of present invention embodiments can index on demand and for a very narrow subset of data (e.g., part of the data for the entire data source). Once the collection is completed, the search engine can discard the index, thereby freeing up storage. The end result is a smaller index space resulting in smaller storage cost and more up-to-date indices, which further minimizes the likelihood of failing to discover the desired documents.

An example environment for use with present invention embodiments is illustrated in FIG. 1. Specifically, the environment includes one or more server systems 10, one or more client or end-user systems 14, an eDiscovery management server system (EMS) 50 that includes an EMA 55, and repositories 80a and 80b. Server systems 10, 50 and client systems 14 may be remote from each other and communicate over a network 70. The network may be implemented by any number of any suitable communications media (e.g., wide area network (WAN), local area network (LAN), Internet, Intranet, etc.). Alternatively, server systems 10, 50 and client systems 14 may be local to each other, and communicate via any appropriate local communication medium (e.g., local area network (LAN), hardwire, wireless link, Intranet, etc.)

Client systems 14 enable users to provide information and queries related to eDiscovery (e.g., data repository addresses, query information to determine relevant documents, etc) to server systems 10, 50 to index data repositories, and to collect and preserve documentation pertinent to eDiscovery. In another example, the information and queries may be provided. directly to the server. Server systems 10 include a search engine 40 including a workflow layer 22 to process requests from EMA 55. The search engine includes an indexing module 16 to generate an index of analyzed data (e.g., an eDiscovery content index), a search module 18 to analyze the eDiscovery content index based on a user query to identify potential collection data sources, and a collection module 20 to perform data collection. Server systems 10 may also include a collection server application that deploys a collection agent to collect information from data sources (e.g., personal devices) that would not generally be considered as data repositories.

Server 50 has a repository information storage area 45 that contains data source information records (e.g., addresses, authentication information, etc.) that allow the search engine to access particular repositories. These records may be generated or obtained from collection requests that are received from EMS 50. If the records are incomplete, the search engine operator will have to complete the records by providing additional information such as authentication parameters. In this example, repository 80a has a record in repository information storage area 45 that allows search engine 40 to access repository 80a. Access to repository 80a is indicated by a dashed connection link 60. Repository 80b, however, is not accessible to search engine 40 as indicated by the absence of a connection link from repository information storage area 45 to repository 80b. Should search engine 40 require access to repository 80b by way of a particular collection request, then a connection workflow is initiated according to the techniques described below in order to place a record in repository information storage area 45 that allows search engine 40 to access repository 80b.

A database system may be provided to store various information for the analysis (e.g., eDiscovery databases and indices, collections of documents, search results, eDiscovery preservations, etc.). The database system may be implemented by any conventional or other database or storage unit, may be local to or remote from server systems 10, 50 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the eDiscovery problem for analysis, and may provide reports including analysis results (e.g., a directory of collected or preserved documents, the storage size of the preservation, other parameters that provide information about the preservation or document therein, etc.).

Server systems 10, 50 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, search engine, workflow layer, indexing module, collection module, browser/interface software, etc.).

Search engine 40, workflow layer 22, indexing module 16, search module 18, and collection module 20 may include one or more modules or units to perform the various functions of present invention embodiments described below. The various modules (e.g., search engine, workflow layer, indexing module, collection module, etc) may be implemented by any combination of any quantity of software and/or hardware modules or units, and may reside within memory 35 of the server and/or client systems for execution by processor 15.

Figure 2:
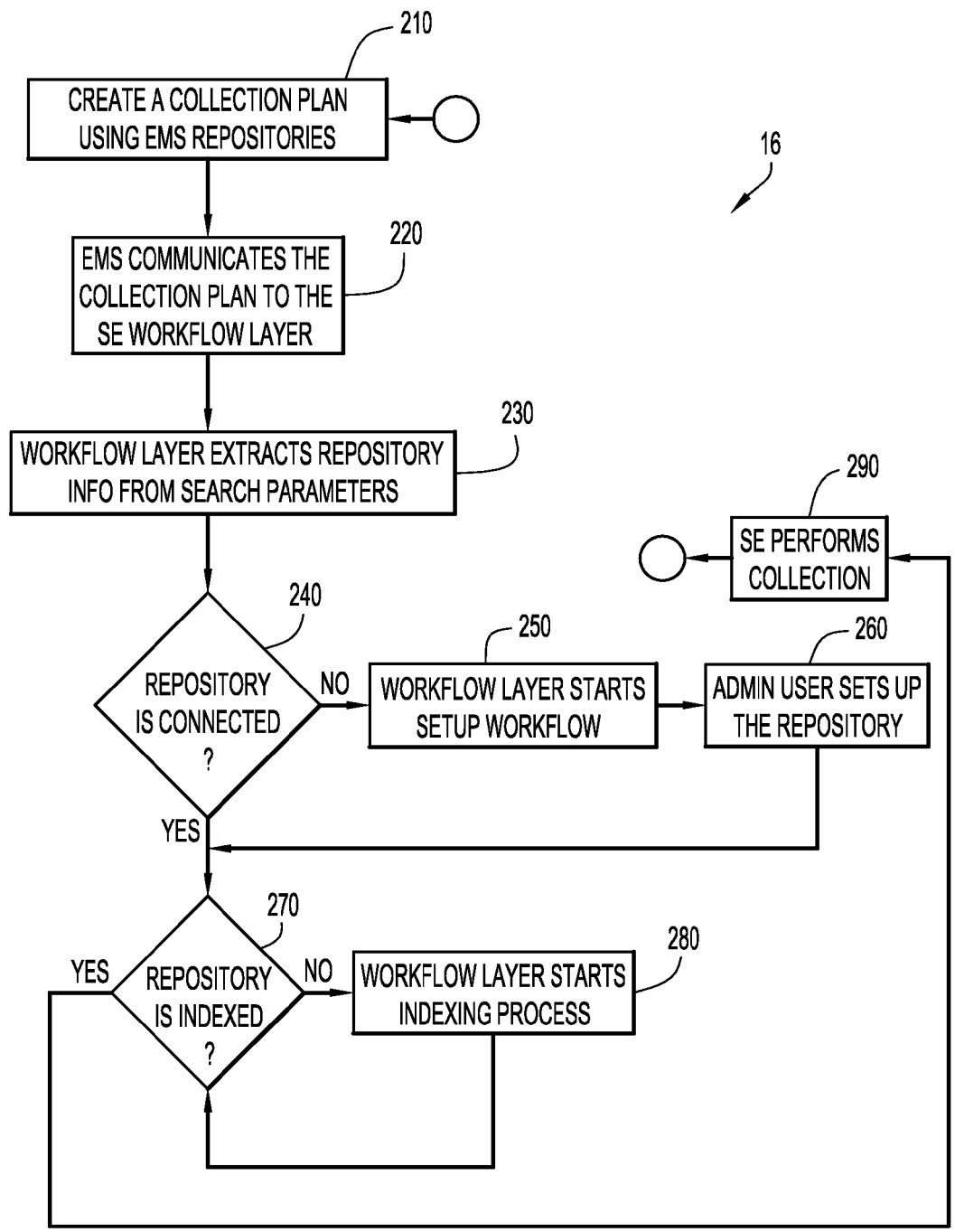
FIG. 2 is a procedural flow chart illustrating a manner in which an eDiscovery is performed on data repositories according to an embodiment of the present invention.

A manner in which search engine 40 (e.g., via a server system 10 and/or client system 14) performs eDiscovery on data repositories according to an embodiment of the present invention is illustrated in FIG. 2. Initially, a collection plan is created at step 210. The collection plan is based on legal requirements derived from the legal action at hand. For example, interviews with individuals or companies involved in litigation will reveal the locations of relevant data and document repositories, and eDiscovery search keywords. An interview with individual ABC working for company XYZ may reveal that the individual's data repository or storage area directory is labeled //accounting/ABC/, if the interviewee is an accountant, or //engineering/ABC/, if the interviewee is an engineer. The interview may also reveal that the interviewee's email address is ABC@XYZ.com. Storage area directories may be referred to as "file shares" or as a "linked" file folders.

The collection plan includes eDiscovery collection parameters such as eDiscovery keywords, repository locations, and dates that may specify an eDiscovery timeframe. The collection plan may include a query that may be entered via a user interface. The collection plan is developed to contain items of interest to be collected from the underlying data sources (e.g., events or decisions pertaining to litigation that occur in a given time frame). A GUI may be provided as an interface to the eDiscovery Management System (EMS) and present a form that allows the user or paralegal to enter the eDiscovery parameters in standardized entry fields.

Information from the collection plan is forwarded from EMS 50 to search engine 40 at step 220. Workflow layer 22 of the search engine processes the collection plan. The search engine workflow layer extracts repository information from the collection plan search parameters at step 230. Once the repository information is extracted, a determination is made as to whether the requisite repositories are connected to the search engine at step 240. In one example, the repository locations (e.g., //accounting/ABC/, //engineering/ABC, etc.) are translated to computer addressable locations of repositories (e.g., in the example above, repositories are file servers located on //accounting and //engineering), such as an Internet Protocol (IP) address or directory address that can be used by the search engine. For example, work-flow layer 22 interprets that the path (e.g., //accounting/ABC/) is on the //accounting file server.

If one or more repositories are not connected to the search engine as determined at step 240, the search engine workflow layer starts a connection workflow at step 250. For example, the workflow layer may not be able to connect to or find //accounting/ABC/ and, as a result, initiates the workflow. The workflow may be started by a work order maintenance ticket, or task notification directed to IT administration that is automatically generated by indexing module 16 (FIG. 1) and sent to IT administration (e.g., by email or other electronic message). Upon receiving the workflow task notification, a network or IT administration user or operator connects the one or more repositories (e.g., //accounting/ABC/) at step 260.

In another example, a connectivity application or module may be integrated into an IT administration application that automatically connects the one or more repositories based in information contained in the workflow task. When connection is complete, IT administration or the application will generate a response ticket or task "complete" notification, and send it to the search engine workflow layer. The search engine workflow layer will notify the EMS user that the workflow task is complete. Alternatively, the response ticket may be sent directly to the EMS user along with any connectivity information (e.g., usernames, passwords, addresses, etc.). Alternatively, a local repository may be created.

As a result of the response ticket, several actions may be performed. One action may be that the IT operator indicates to the search engine workflow layer that indexing may be performed for the newly connected repositories (e.g., //accounting/ABC/). The operator may have to enter additional information into the collection plan (e.g., usernames, passwords, addresses, etc.) to complete the process. Another action may be that the IT administration application or other module inserts information for the newly connected repositories into the collection plan and initiates the indexing.

Once the repositories are connected (e.g., as determined at step 240 or after connection of a new repository), the search engine determines whether requisite repositories are indexed at step 270, When a particular repository is not indexed (e.g., //accounting/ABC/), the search engine workflow layer (e.g. via indexing module 16) starts the indexing process at step 280. Indexing may further be accomplished for previously indexed repositories after expiration of a predetermined time interval. The index of analyzed repository data may include annotations referencing the eDiscovery records, extensible markup language (XML) representations of eDiscovery records, and/or metadata configured to provide additional eDiscovery record based information based on information from the collection plan. Unstructured data contained in text documents (e.g., reports, mails, web pages, etc.) contain valuable information. Most of the data in an enterprise, intelligence, and other illumination driven environments is of an unstructured nature. This data can be used effectively and efficiently by creating some form of structured view of the documents (e.g., for advanced searching or data mining). Indexing provides such a structured view of unstructured data.

When indexing is complete or partially complete (as a result of not all of the repositories being connected) for a repository and a query is received, the search engine (e.g., via collection module 20) performs collection at step 290. Collection of data and files starts by searching the index (e.g., via search module 18). Searches may also be performed using text analytics, forensic analysis, or standard database search techniques. Any matches to the received search query are returned and stored. The search results may further contain information (e.g., metadata) from the index that enable collection module 20 to retrieve the original source documents. For example, search results metadata may include, for example, e.g., file name; original location; creation, access, and modification dates; owner, etc. As part of the collection process, documents and data may be copied and stored in a separate collection repository. Optionally, search results metadata may also be moved to the collection repository. When a given collection plan is complete, content index may be deleted.

Any of the source documents, collection plans with queries, indices, search results, relevance scores, collection reports, etc., may be stored within a database system, or locally on the server and/or client system performing the analysis.

Steps 240-290 described above may be performed asynchronously (e.g., indexing and collection may start as soon as a repository is known to be connected without waiting for all repositories in the collection plan to become connected).

Figure 3:
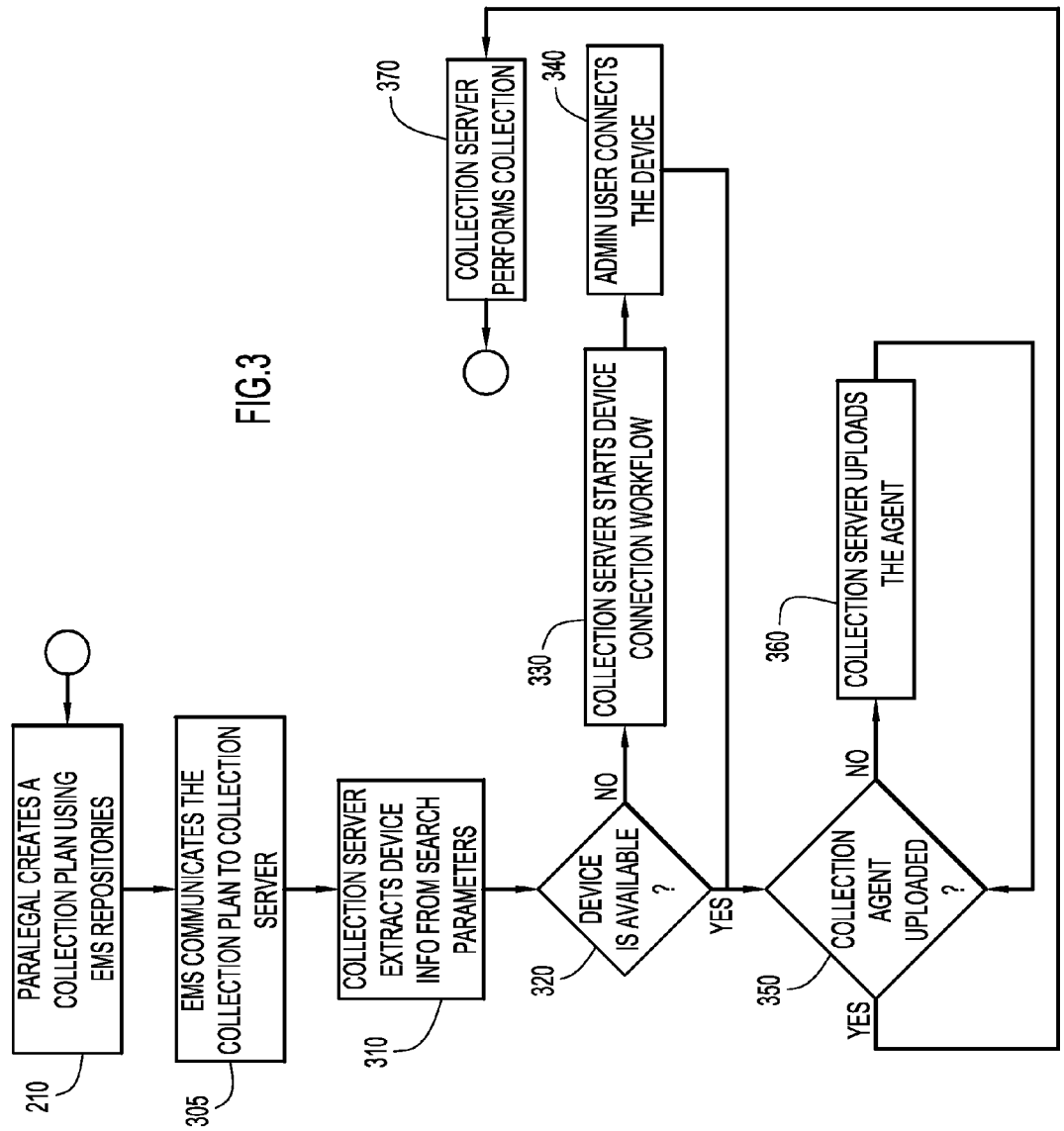
FIG. 3 is a procedural flow chart illustrating a manner in which an eDiscovery is performed on personal or computing devices according to an embodiment of the present invention.

Further, a process similar to the above process may be performed for collecting information from personal or computing devices. In this example, a collection server and a collection agent preform the collection. The collection server may reside with or be part of the search engine, or be a separate server application. A manner in which a collection server (e.g., via a server system 10 and/or client system 14) performs eDiscovery on personal or computing devices according to an embodiment of the present invention is illustrated in FIG. 3. As described above in connection with FIG. 2, a collection plan is created at step 210 (e.g., by an operator that may be a paralegal). Information from the collection plan is forwarded from EMS 50 to the collection server at step 305. The collection server processes the collection plan. In this example process, the collection server extracts device information from the collection plan search parameters (e.g., instead of repository information) at step 310. The device may be, for example, a desktop, laptop, personal digital assistant (PDA), or other portable or stationary device. Once the device information is extracted, a determination is made as to whether the device is available or otherwise connected to the search engine at step 320, If the device is not connected to the collection server as determined at step 320, the collection server starts a connection workflow at step 330. The workflow may be started by a work order, workflow task notification, or maintenance ticket as described above. Upon receiving the workflow task, a network or IT administration operator connects the device at step 340. Alternatively, the workflow task may be sent directly to the device user requesting connectivity information (e.g., usernames, addresses, etc.), requesting the device's user to connect to the network, and login. A local repository may be created for the data source on server systems 10, client systems 14, or on the device.

Once the device is connected (e.g., as determined at step 320), the collection server determines whether a collection agent is uploaded to the device at step 350. Note that it is not necessary to configure the device collection agent in advance. Once the collection server receives a collection request from EMS 50, the collection server verifies whether the device already has a collection agent deployed or uploaded (e.g., as determined at step 350). When a particular device does not have a collection agent, the collection server uploads the collection agent to the device at step 360. The collection agent may be manually, semi-manually, or automatically deployed to the device. The collection agent may also signal the collection server any time the device is available for collection. When the device is ready for collection, the collection server will work with the collection agent to perform the collection at step 370. The collected data may be retrieved manually or sent to the collection server (e.g., by way of a wired or wireless network). Once collection is complete, the collection agent may be removed or deleted from the device.

In some environments data repositories and desktop/personal devices may both have discoverable content. A manner in which eDiscovery may be performed manually or by search engine 40 (e.g., via a server system 10 and/or client system 14) from repositories or personal devices according to an embodiment of the present invention is illustrated in FIG. 4.

Initially, a collection plan is created at step 210. Information from the collection plan is forwarded from EMS 50 to search engine 40 at step 220. The search engine workflow layer extracts repository or device information from the collection plan search parameters at step 230. Once the repository (or device) information is extracted, a determination is made as to whether the requisite repositories or devices are connected to the search engine at step 240.

If one or more repositories or devices are not connected to the search engine as determined at step 240, the search engine workflow layer starts a connection workflow at step 250. A determination is made as to whether a given repository or device can be setup or connected to the search engine at step 410. If the repository or device is not connectable (e.g., for a desktop, laptop, etc.), the IT administration operator will utilize a collection server or other tool at step 420 to manually perform collection from the repository or device.

If the repository or device can be connected, a network or IT administration operator connects the one or more repositories or devices at step 260 (e.g., per the workflow task notification). In the case of a device, the collection agent is deployed as described above. With respect to repositories, once the repositories are connected (e.g., as determined at step 240 or after setup of a new repository at step 260), the search engine determines whether requisite repositories are indexed at step 270. When a particular repository is not indexed, the search engine workflow layer (e.g. via indexing module 16) initiates the indexing process at step 280. When indexing is complete or partially complete (as a result of not all of the repositories being connected) for a repository and a query is received, or when the collection agent is deployed on the device, the search engine (e.g., via search module 18 and collection module 20) performs search and collection at step 290.

It will be appreciated that the embodiments described above and illustrated in the drawings represent only a few of the many ways of implementing embodiments for automated electronic discovery collections and preservations.

The environment of the present invention embodiments may include any number of computer or other processing systems (e.g., client or end-user systems, server systems, EMS or other systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc,), and may include any commercially available operating system and any combination of commercially available and custom software (e.g., browser software, communications software, server software, indexing module, search module, collection module, etc.). These systems may include any types of monitors and input devices (e.g., keyboard, mouse, voice recognition, etc.) to enter and/or view information.

It is to be understood that the software (e.g., search engine, workflow layer, indexing module, search module, collection module, collection tool, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., search engine, workflow layer, indexing module, search module, collection module, collection tool, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The collection servers and/or agents may be any conventional or other collection software that may be deployed on personal or computing devices, and as such, may be tailored to a particular device's operating system (OS). The collection servers and/or agents may be operated in any form (e.g., as an application, process thread, background process, etc.), and may perform collection in any manner suitable for eDiscovery or like applications. The collection servers and/or agents may be configured to report errors (e.g., disk full, out of memory, etc.) for the device. When device resources are limited the collection servers and/or agents may perform collection in a piecewise or step-by-step fashion.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., documents, document collections, indices, preservations, annotations, analyzed data, etc.). The database system may be implemented by any number of any conventional or other databases, data stores or storage structures (e.g., files, databases, data structures, data or other repositories, etc.) to store information (e.g., documents, document collections, indices, preservations, annotation, etc.). The database system may be included within or coupled to the server and/or client systems. The database systems and/or storage structures may be remote from or local to the computer or other processing systems, and may store any desired data (e.g., documents, document collections, indices, preservations, annotation, etc.). Further, the metadata (e.g., indices, annotations, reports, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for determining any desired discovery of information (e.g., legal, account, taxation, engineering report, any combinations thereof, etc.) from any type of document (e.g., speech transcript, web or other pages, word processing files, spreadsheet files, presentation files, electronic mail, multimedia, etc.) containing text in any written language (e.g. English, Spanish, French, Japanese, etc.). The discovery information may pertain to any type of company or entity operations (e.g., manufacturing, internal processes and workflows, hardware and software product development, etc.).

The correlation scores may be determined in any fashion, and include any desired value within any desired value range. For example, the correlation score may be the actual date difference, or convert an actual date difference to any desired value range (e.g., 0-100, 0-10, 0-1, etc.) via any conventional or other techniques (e.g., normalization, look-up table, mathematical formula or operation, etc.). Any quantity of analysis techniques may be applied to documents to generate the indices and repositories. The analysis techniques may measure any desired quantity of characteristics, where the measurements may be combined in any fashion to produce the correlation score (e.g., average or weighted average, summation, etc.). Any quantity of source data (documents, emails, etc.) and correlation scores may be compared to produce most likely eDiscovery matches.

The collection plans may be developed in any manner (e.g., manually developed, based on a template, etc.) and contain any type of data (names, nouns, verbs, numbers, etc.) and/or rules (e.g., grammatical, lexical, or mathematical constructs). The collection plans may be designed in any manner that facilitates tagging or document analysis by an analysis engine, annotator, or search engine. The collection plans may be in any format (e.g., plain text, relational database queries, nested XML code, etc.). Any number of collection plans may be used for analysis.

Text analytics may be performed using any manner of text analysis (e.g., linguistic, semantic, statistical, machine learning, natural language processing, etc.). Text analytics may use any form of information retrieval and lexical analysis to analyze word frequency distributions, and perform pattern recognition, tagging, annotation, information extraction, and/or data mining. Text analysis techniques may include link and association analysis, visualization, and predictive analytics.

The present invention embodiments may employ any number of any type of user interface (e.g., Graphical User Interface (GUI), command-line, prompt, etc.) for obtaining or providing information (e.g., documents, document collections, addresses, collection plans, queries, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, correlation scores; index, collection, or preservation reports, etc.).

The present invention embodiments are not limited to the specific tasks or algorithms described above, but may be utilized for determining eDiscovery or other information (with identifiable characteristics) for any types of documents.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each. block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of collecting information from data sources comprising:
   receiving a collection request at a collection tool including a search engine to collect information, wherein the collection request includes data source information indicating a previously unidentified data source and a previously identified data source from which to retrieve the information;
   associating the data source information in the collection request with one or more electronic data repositories for the data source indicated by the data source information being previously unidentified to the collection tool;
   indexing the one or more associated electronic data repositories to produce an index, wherein the indexing includes:
      indexing one or more electronic data repositories associated with the previously identified data source to produce the index in response to one of a predetermined time interval elapsing from a previous indexing of the one or more electronic data repositories and the one or more electronic data repositories not being indexed; and collecting the information from the one or more associated electronic data repositories based on the index.

2. The computer-implemented method of claim 1, further including:

deleting the index subsequent to completion of the collection of information.

3. The computer-implemented method of claim 1, wherein the associating the data source information in the collection request with one or more electronic data repositories includes:

creating a repository entry for the previously unidentified data source; and requesting information from a user pertaining to the previously unidentified data source.

4. The computer-implemented method of claim 1, wherein the associating the data source information in the collection request with one or more electronic data repositories includes:

generating a message to a search engine administration function that includes information configured to request that the previously unidentified data source indicated by the data source information be made accessible to the search engine.

5. The computer-implemented method of claim 4, wherein the method further includes receiving a response to the message indicating that the previously unidentified data source indicated by the data source information is accessible.

6. The computer-implemented method of claim 1, wherein the data source information further indicates a computing device previously unidentified to the collection tool, and the method further comprises:

deploying a collection agent to the computing device to collect the information.

* * * * *